(12) United States Patent  (10) Patent No.: US 8,403,188 B2
Platsch  (45) Date of Patent: Mar. 26, 2013

(54) DOSING DEVICE FOR POWDER (75) Inventor: Hans G. Platsch, Stuttgart (DE)

(73) Assignee: Platsch GmbH & Co. KG (DE)

( * ) Notice: Subject to any disclaimer, the term of this patent is extended or adjusted under 35 U.S.C. 154(b) by 1170 days.

(21) Appl. No.: 12/047,900

(22) Filed: Mar. 13, 2008

(65) Prior Publication Data
US 2008/0236702 A1 Oct. 2, 2008

(30) Foreign Application Priority Data
Mar. 26, 2007 (DE) .................. 10 2007 014 917

(51) Int. Cl.
G01F 11/10 (2006.01)
(52) U.S. Cl. ........ 222/636; 222/342; 222/345; 222/368; 222/370; 141/98; 141/67
(58) Field of Classification Search .................. 222/636, 222/152, 342, 345, 367–370, 630, 425, 442; 141/67, 237, 248, 192, 8, 65, 98; 118/300; 414/291
See application file for complete search history.

(56) References Cited

U.S. PATENT DOCUMENTS

| 3,266,677 | A | * | 8/1966 | Hamilton | 222/370 |
| 4,005,668 | A | * | 2/1977 | Washington et al. | 141/67 |
| 4,227,835 | A | * | 10/1980 | Nussbaum | 406/52 |
| 4,341,244 | A | * | 7/1982 | Facchini | 141/18 |
| 4,371,101 | A | * | 2/1983 | Cane et al. | 222/636 |
| 4,509,568 | A | * | 4/1985 | Kawaguchi et al. | 141/129 |
| 4,528,848 | A | * | 7/1985 | Hafner | 73/218 |
| 4,863,076 | A | * | 9/1989 | Anderson et al. | 222/636 |
| 4,949,766 | A | * | 8/1990 | Coatsworth | 141/67 |
| 5,645,379 | A | * | 7/1997 | Stoner et al. | 406/67 |
| 6,340,036 | B1 | * | 1/2002 | Toyoizumi et al. | 141/275 |
| 6,416,261 | B2 | * | 7/2002 | Martin | 406/128 |
| 6,651,843 | B2 | * | 11/2003 | Kowalsky et al. | 222/1 |
| 6,889,722 | B2 | * | 5/2005 | Huss | 141/8 |
| 6,971,554 | B2 | * | 12/2005 | Rochat | 222/370 |
| 7,021,635 | B2 | * | 4/2006 | Sheydayi | 279/3 |
| 7,237,699 | B2 | * | 7/2007 | Zill et al. | 222/636 |
| 7,252,120 | B2 | * | 8/2007 | Beane | 141/71 |
| 7,284,679 | B2 | * | 10/2007 | Zill et al. | 222/1 |
| 7,866,352 | B2 | * | 1/2011 | Kimura et al. | 141/8 |
| 2008/0202630 | A1 | * | 8/2008 | Kax et al. | 141/18 |

FOREIGN PATENT DOCUMENTS

DE 4237111 A1 5/1994

* cited by examiner

Primary Examiner — Kevin P Shaver
Assistant Examiner — Andrew P Bainbridge
(74) Attorney, Agent, or Firm — Factor Intellectual Property Law Group, Ltd.

(57) ABSTRACT

A dosing device for powder has an inlet and an outlet for powder. A dosing disc rotatable from inlet to outlet has a dosing area of sintered material, which is provided with cavities for the volumetric dosing of the powder. A dosing body having open dosing cavities is provided which is movable from the inlet and outlet. By changing the speed of rotation of the dosing disc the quantity of powder to be discharged can be set in a wide range.

20 Claims, 6 Drawing Sheets

DOSING DEVICE FOR POWDER

CROSS-REFERENCE TO RELATED APPLICATIONS

This application claims the filing benefit of German Patent Application No. 10 2007 014 917.6, filed Mar. 26, 2007, the contents of which are incorporated herein by reference.

TECHNICAL FIELD

The invention relates to a dosing device for powder with a housing, which has an inlet for powder and an outlet for discharging a dosed quantity of powder, wherein a dosing body movable from the inlet to the outlet is provided, which has a dosing area, which contains open dosing cavities, and that inlet and outlet both face the dosing area.

BACKGROUND OF THE INVENTION

A powder coating device known from DE 42 37 111 B4 has a storage container for finely ground powder and a controllable dosing device, with which a powder flow of desired magnitude can be set. The powder flow is supplied to an atomizing device, which distributes the fine particles of the powder flow uniformly in a carrier gas stream. The carrier gas stream with the powder particles is conducted through a pipe system to nozzles, which are provided to discharge the powder mist generated onto the objects to be coated. A targeted application of powder onto print products fresh off the press, for example, is thus achieved, in order to avoid a block formation between the print products.

The present invention is provided to address these and other considerations.

SUMMARY OF THE INVENTION

An object of the invention consists in creating a dosing device for powder, which device can discharge a quantity of powder per unit of time that is adjustable in a wide range with high dosing accuracy.

This object may be achieved by a dosing device with a housing, which has an inlet for powder and an outlet for discharging a dosed quantity of powder, wherein a dosing body movable from the inlet to the outlet is provided, which has a dosing area, which contains open dosing cavities, and that inlet and outlet both face the dosing area.

In the dosing device according to the invention, the quantity of powder to be discharged can be set in a wide range via the relative speed of the dosing body in relation to the housing. The discharge quantity for the powder can preferably be set in a range from less than 50 grammes per hour to more than 2000 grammes per hour. This facilitates an accurate adaptation of the powder quantity discharged by the dosing device to the requirements of the work pieces to be powder coated, e.g. print products fresh from the press or glass or rubber products.

The dosing cavities in the dosing area serve to receive the powder temporarily.

In the dosing device according to the invention, no minimum speed must be adhered to for an air flow conveying powder or for a powder flow to guarantee proper functioning. This makes it possible to set the powder quantity in the wide range indicated above.

In one development of the invention wherein the dosing area of the dosing body cooperates with a powder scraper, it is advantageous that filling of the dosing cavities in the dosing area of the dosing body can be undertaken relatively inaccurately initially. No exact configuration or orientation of the inlet is necessary in itself. The exact volumetric dosing takes place following the feed of the powder onto the dosing area through the interaction with the scraper. The scraper passes over the dosing area in the manner of a doctor blade and only lets a defined layer thickness of the powder applied to the dosing area pass in the direction of the outlet, while excess powder is held back. The scraper can slide directly on the surface of the dosing area, so that downstream of the scraper only the dosing cavities are filled with powder. Alternatively, it can also be provided that the scraper leaves a specifiable powder layer thickness on the dosing area, due to which a larger quantity of powder can be made available downstream of the scraper at the outlet.

In another development of the invention wherein the dosing body is moved by a drive motor of controllable speed, it is advantageous that the powder quantity can be set simply and precisely via the speed of the drive motor (normally its rpm) by an electrical signal. When using a stepping motor, a very precise setting of the rpm of the drive motor in broad limits is guaranteed with a commercially available operating circuit for this stepping motor. With reference to the precisely specifiable speed of the dosing body and the exact positioning of the scraper relative to the dosing area, the powder quantity supplied by the dosing device overall is determined exactly in a wide quantity range.

In another development of the invention wherein the inlet has a feed pipe, which is arranged above the dosing body and the lower end of which forms the scraper, it is advantageous that limiting of the powder flow takes place even when the powder is being applied to the dosing body. No excess powder is thereby applied to the dosing body and thus does not have to be removed from the dosing area either. This considerably simplifies the handling of the powder, since refeeding of scraped powder entails an additional outlay as well as the risk of contamination of the powder contained in the powder store. The inlet executed as a feed pipe thus fulfills a double function of supplying the powder to the dosing area and limiting the powder quantity discharged onto the dosing area in the manner of a doctor blade.

In another development of the invention wherein outside the dosing area the dosing body has at least one calibrating projection, which cooperates in a calibration position for setting a working distance between the scraper and the dosing area with a housing-fixed stop, it is advantageous that setting of the distance between the scraper or the feed pipe and the dosing area is simplified. To set the distance, the feed pipe is put onto the projection in a calibration position and fixed in this position. Then the feed pipe is moved over the dosing area, in particular swung, without the distance from the dosing area being changed. Due to this, the feed pipe is at exactly the desired working distance from the surface of the dosing area. The set-up time for setting the dosing device is thus shortened, and laborious determination and remeasurement of a desired working distance between the scraper and dosing area are eliminated. Setting means are preferably assigned to the feed pipe, which means facilitate a fine, controlled displacement and/or swing between a calibration position and a dosing position without changing the distance between the feed pipe and the dosing area.

In another development of the invention wherein the dosing cavities comprise holes and/or indentations, it is advantageous that the dosing body can be manufactured using conventional manufacturing methods, in particular by cutting methods such as turning, boring, milling and/or by forming methods such as embossing, forging or pressing.

In another development of the invention wherein the dosing body is manufactured from a sintered material, it is advantageous that the dosing body has a quasi-continuous dosing area. In volume the dosing area also has the same properties up to its rear side remote from the inlet and outlet. It is thus open-pored overall. The dosing cavities can thus be blown out, so that on outlet no powder remains unchecked in the dosing cavities. This is advantageous with regard to a high dosing accuracy.

The dosing body also has a low weight compared with a dosing body manufactured from solid material. With the given drive motor this facilitates higher dynamics on braking and acceleration of the dosing body by the drive motor, or vice-versa with the same demands on acceleration and braking the use of a drive motor with lower power.

Moreover, the porous structure of the sintered material offers an ideal dosing matrix provided with a plurality of dosing cavities or pores, in which matrix the powder is transported reliably from inlet to outlet.

In a further development of the invention wherein the dosing body is pressed to flatness at least in the dosing area, it is advantageous that due to the pressing process, the surface of the dosing area is exactly flat, so that together with a scraper, precisely reproducible filling of the dosing cavities independently of the position of the dosing body is obtained.

Due to pressing, dosing cavities initially created to be oversized can also be adjusted more precisely to a predetermined medium size than purely due to the sintering process, as on sintering material loss occurs. Thus through pressing of the dosing area an improvement is achieved in dosing accuracy for the dosing body.

In yet another development of the invention wherein a gaseous fluid can flow through the dosing body, it is advantageous that a feed flow of transport gas, in particular air, can take place through the dosing body, so that the powder can be sucked (or blown) reliably out of the dosing cavities of the dosing body.

In yet a further development of the invention wherein the dosing body is carried by a support body, which together with the rear of the dosing body facing away from inlet and outlet forms a fluid distribution space, which is connected to a fluid source, it is advantageous that the dosing body has a simple, in particular discoidal, preferably plane-parallel shape and can be produced cheaply as a sintered part. The support body can be coupled to the drive motor and then transmits its movement to the dosing body, serving in addition to stabilize the dosing body mechanically.

In yet another development of the invention wherein the dosing body has a substantially powder-tight circumferential collar delimiting the dosing area, it is advantageous that no powder can escape through an edge area of the dosing body and conversely air flows present in the environment are kept away from the dosing area, due to which misdosing is avoided.

In yet a further development of the invention wherein the edge of the feed pipe serving as scraper extends substantially in a direction perpendicular to the direction of movement of the dosing body, wherein the end of the feed pipe adjacent to the dosing body has preferably a clear opening with an edge contour that is in the form of a ring segment, square, or rectangular, it is advantageous that the powder on the front edge serving as a scraper is distributed substantially uniformly in a radial direction of the dosing body. In the relative movement between inlet and dosing body, no movement components oriented in a radial direction occur, so that a homogeneous distribution of the powder in a radial direction over the dosing body is guaranteed.

In a still further development of the invention wherein the dosing body has an annular dosing area, and is rotatable about the axis of the dosing area, it is advantageous that the dosing body has simple geometry and can be moved by a normal rotating drive motor. In this case the dosing cavities ensure that even at higher speeds of the dosing body, no powder is blown away from the surface of the dosing body. In addition, the powder lies reliably on the substantially level dosing area, so that a speed of the dosing body can be selected freely in a wide range, so that a broad quantity setting of the dosing is possible.

In yet another development of the invention wherein the dosing body has a cylindrical dosing area and is rotatable about the axis of the dosing area, it is advantageous that such a special compact design of the dosing body is possible. Even with a horizontal alignment of the axis of rotation and offsetting of outlet and inlet by 180°, it can be achieved that gravity supports both the filling of the dosing cavities on inlet and emptying of the dosing cavities on outlet.

In yet a still further development of the invention wherein the housing and a drive motor acting on the dosing body are elastically suspended together, it is advantageous that the oscillations occurring on operation of the drive motor, which oscillations are caused for example by the choice of the drive motor as a stepping motor and/or by unbalances in the drive motor and/or in the dosing body, cause vibrations of the entire dosing device. These prevent powder from sticking at various points of the device and encourage fluidization of the powder to be transported, due to which an improvement in dosing accuracy is likewise achieved.

And in yet another development of the invention wherein the inlet is connected to a powder storage container that is funnel-shaped at least on outlet, wherein the inclination of the funnel walls to the horizontal is greater than 45°, it is advantageous that the powder storage container promotes a continuous inflow of powder to all areas of the inlet, which contributes further to the dosing accuracy.

These and other benefits of the present invention will become more readily apparent after a review of the detailed description and preferred embodiment.

DETAILED DESCRIPTION OF THE INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 1:
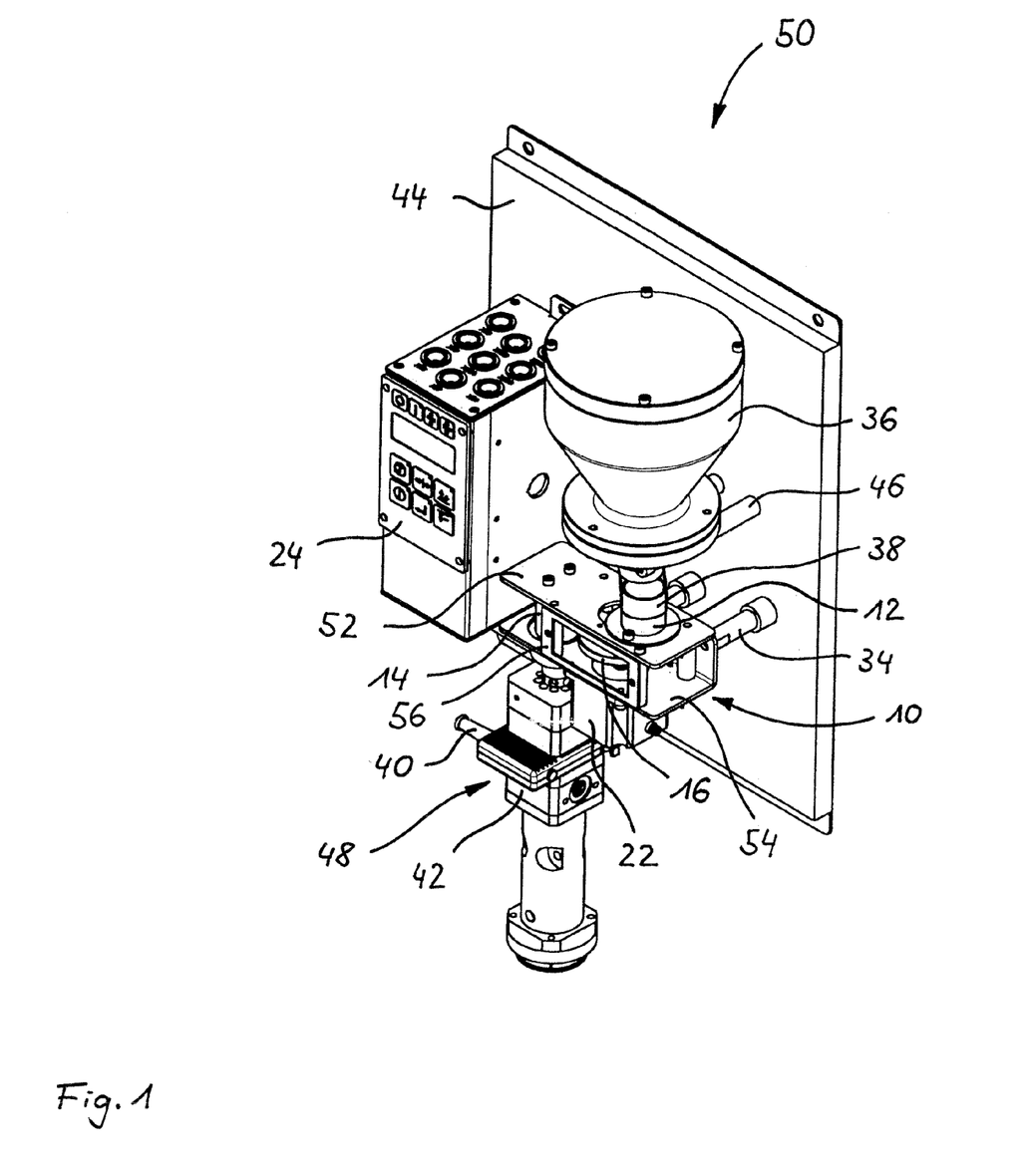
FIG. 1 shows a representation in perspective of a powder dosing device with an assigned control device and a powder flow measuring device.

A powder dosing device 50 shown in FIG. 1 has a powder doser 10 as a mechanical component and a control computer 24 as an electronic component. The powder doser 10 and the control computer 24 are mounted on a common attachment plate 44. The attachment plate 44 is used for the common simple mounting of the powder dosing device 50 on a machine (not shown), e.g. a printing machine, and as a bearing plate for the vibratory suspension of various device components.

The control computer 24 is a programmable controller and controls all functions of the powder dosing device 50 as a function of user-defined requirements and/or requirements specified by a powder consumer.

The powder doser 10 forms the heart of the powder dosing device 50. It ensures a precise supply of a powder quantity per unit of time determined by the control computer 24, i.e. a powder volume flow.

The powder to be supplied by the powder doser 10 is taken from a storage hopper 36 and from there discharged via a feed pipe 12 to the powder doser 10. The storage hopper 36 is formed cone-shaped in a lower section, in order to guarantee a continuous and spatially uniform supply of powder to the feed pipe 12.

The storage hopper 36 is connected fixedly via support stays 46 to the attachment plate 44. To connect the outlet pipe, which is not provided with a reference sign, on the underside of the storage hopper 36 to the feed pipe 12, a flexible silicone hose 38 is provided, which facilitates relative movements between the storage hopper 36 and the powder doser 10. Such relative movements are caused by the stepping motor 22 provided on the powder doser 10 and the dosing disc 16 coupled thereto due to the step activation of the stepping motor 22 (and due to any unbalances present in the stepping motor 22 and/or on the dosing disc 16).

Vibrations of the powder doser 10 are desirable, as these promote fluidization of the powder and prevent sticking of powder on walls and thus promote an exact powder dosing. To achieve oscillation of the powder doser 10 that is as free as possible, this is attached to the attachment plate 44 via elastic rubber mounts 34.

Connected to the powder doser 10 on the outlet side is a suction device 48 operating according to the water jet principle, which device comprises a disconnection bellows 14 connected directly to the outlet of the powder doser 10, a compressed air injector that is not shown in greater detail, and a powder density sensor 42.

With the components described above, the powder dosing device 50 permits the extraction of powder from the storage hopper 36, the supply of the powder to the powder doser 10, precise dosing of the powder quantity with the aid of the powder doser 10 and transportation of the powder away from the powder doser 10 by a flow of vacuum air. On passing the powder injector, the evacuated powder is diluted with the aid of compressed air to give a powder gas flow similar to a mist.

The powder density in the powder gas flow is ascertained with the aid of the powder density sensor 42 and is supplied as a measuring signal to the control computer 24. This can set the powder density in a specifiable density range by influencing the powder doser 10. The powder gas flow is supplied to a nozzle arrangement, which is not shown in greater detail, which applies the powder e.g. to print products fresh from the press, in order to avoid damage due to adhesion of the print film, which is not yet fully dried, to an adjacent printed sheet.

Figure 2:
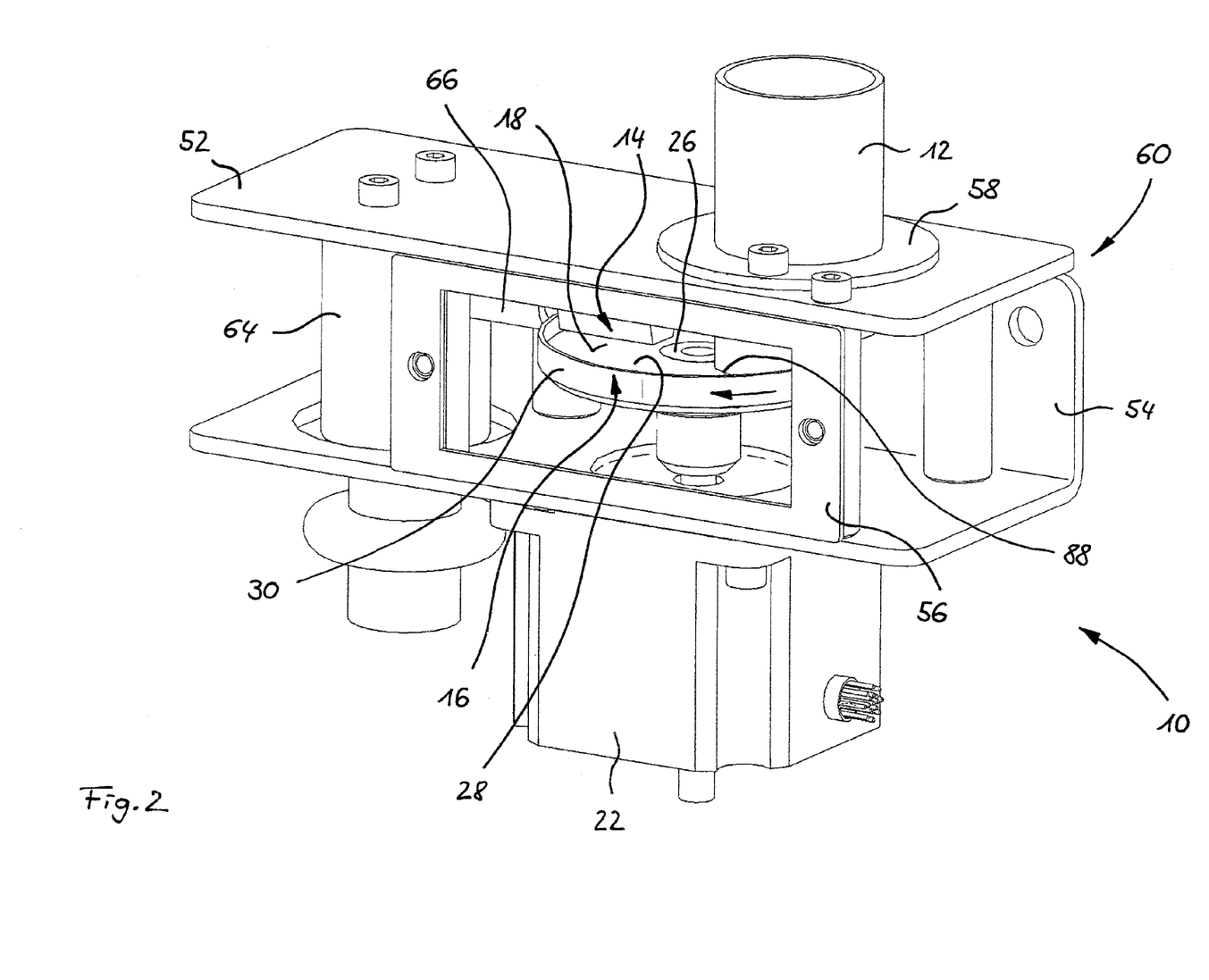
FIG. 2 shows a representation in perspective of the dosing device according to FIG. 1.

The powder doser shown in greater detail in FIG. 2 has a housing 60, which is formed substantially from a cover plate 52, an angle plate 54 and a front plate 56. The cover plate 52 is penetrated by the feed pipe 12, which projects into the housing 60 and facilitates feeding of the powder onto a dosing disc 16, which is likewise arranged in the housing 60.

Figure 3:
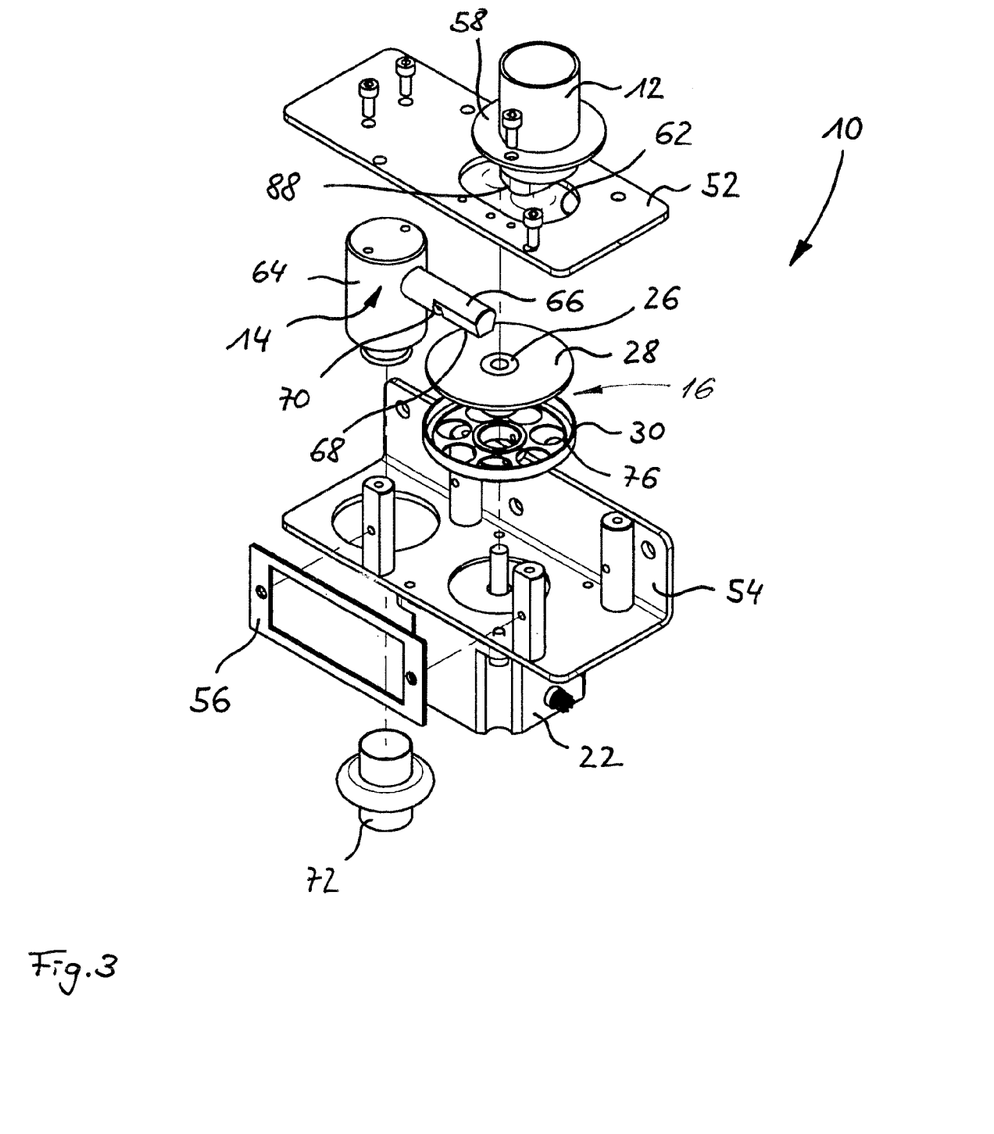
FIG. 3 shows an exploded drawing in perspective of the dosing device according to FIG. 2 with a dosing disc manufactured from sintered metal, which disc is carried by a support disc.
Figure 4:
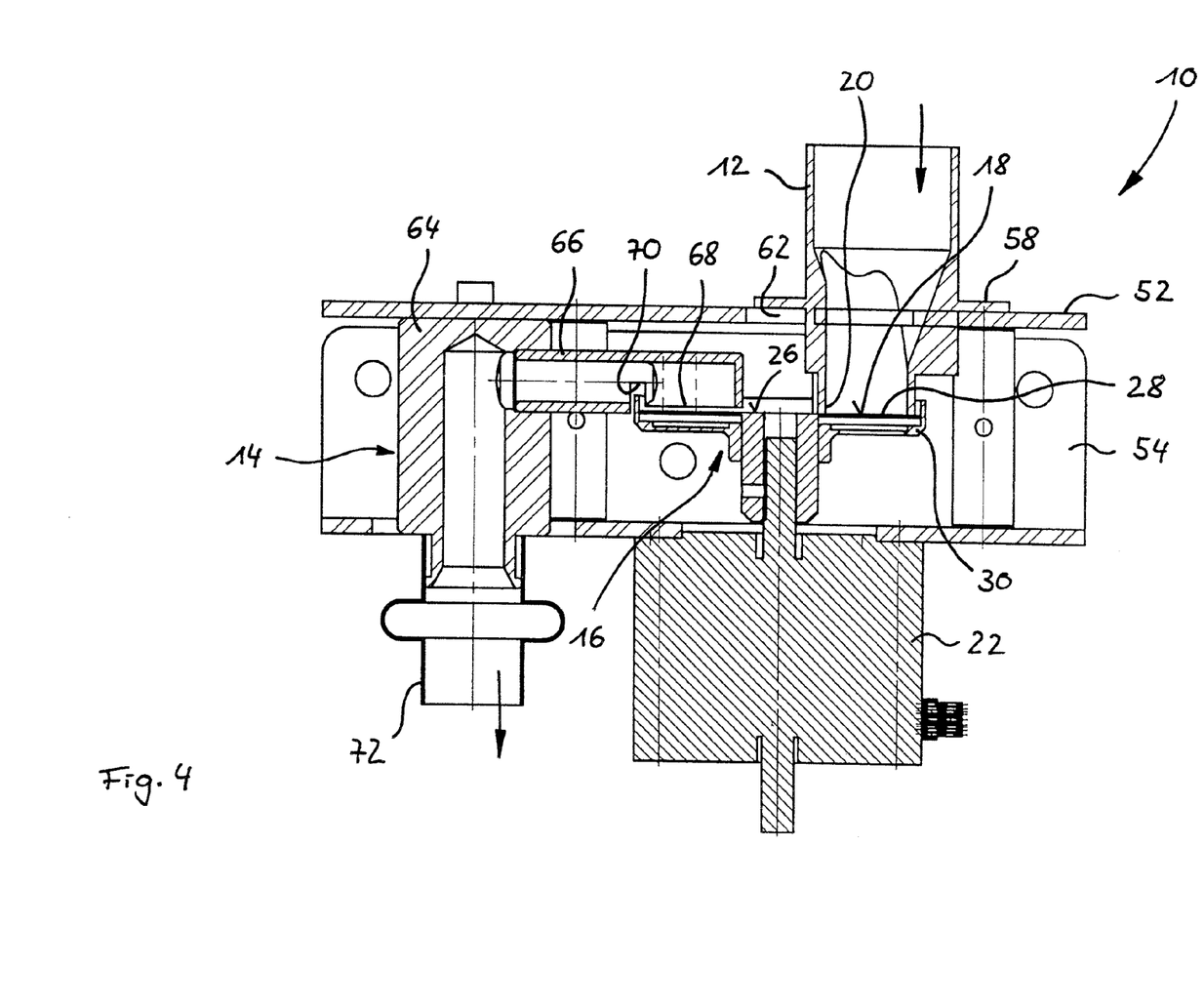
FIG. 4 shows a sectional representation of the dosing device according to FIGS. 2 and 3.

As shown in greater detail in FIGS. 3 and 4, the dosing disc 16 is constructed in a first embodiment of the invention from a circular, plane-parallel sintered disc 28 and a disc carrier 30 serving as a coupling between stepping motor 22 and sintered disc 28. The dosing disc 16 is supported rotatably by means of the stepping motor 22 in relation to the feed pipe 12 and the disconnection bellows 14.

Figure 5:
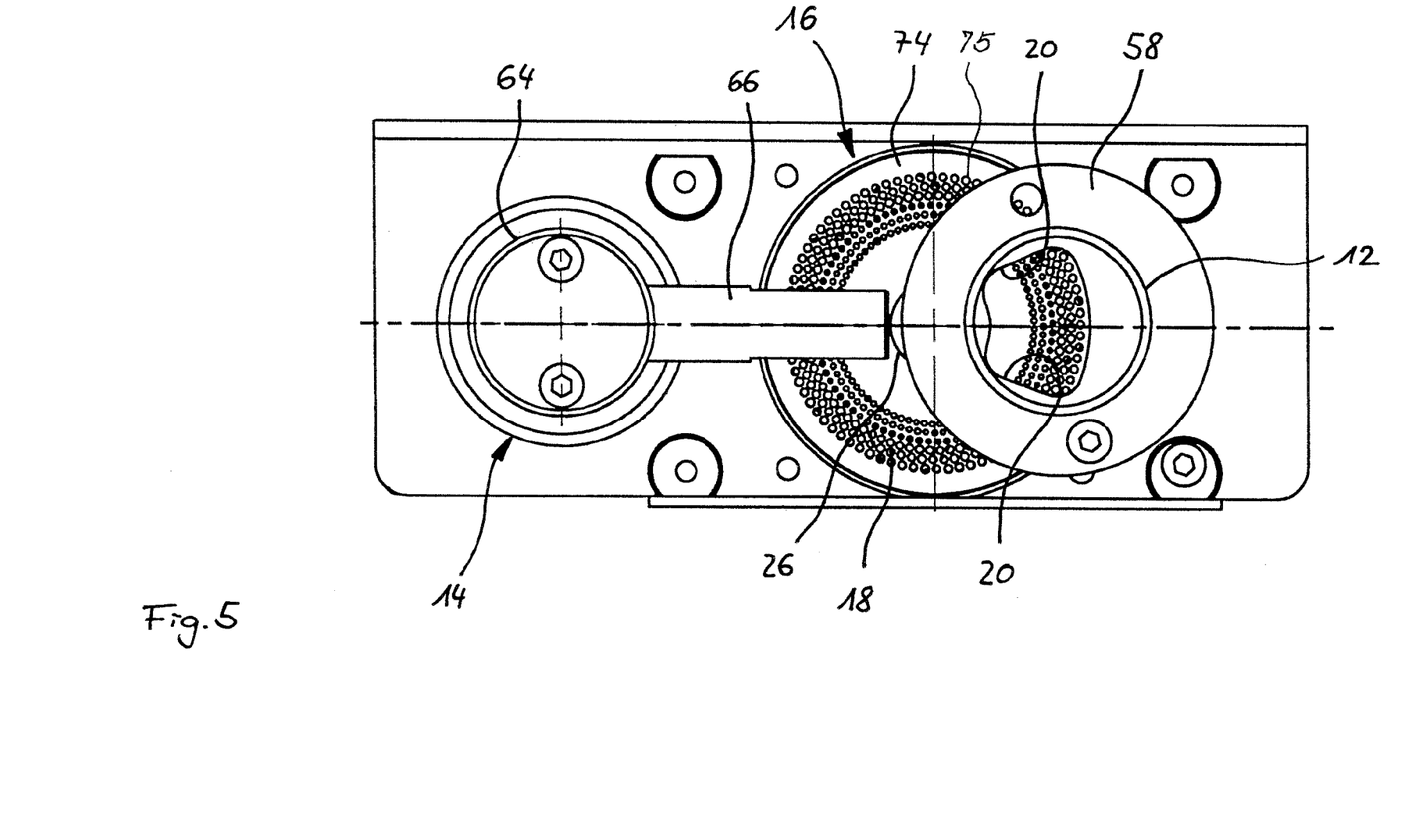
FIG. 5 shows a second embodiment of a dosing device with a dosing disc, which is a solid part with a hole pattern.

The feed pipe 12 executed above the cover plate 52 in the form of a cylindrical sheath has a cross-section in the manner of a ring segment, which can be inferred in particular from FIG. 5, in the area of the dosing disc 16. An adaptation of the powder discharge cross-section of the feed pipe 12 to the shape of the dosing disc 16 is achieved thereby.

The feed pipe 12 is fastened by several screws, not described in greater detail, to the cover plate 52 and can be moved from the functional position shown in FIGS. 2 and 4 into a setting position, which is not shown. In the setting position, a front face of the feed pipe 12 facing the dosing disc 16 lies on a circular setting collar 26 of the dosing disc 16. This setting collar 26 projects upwards in a vertical direction (according to the representation in FIG. 2) above the sintered disc 28 and thereby facilitates a defined height setting of the feed pipe 12 relative to the sintered disc 28.

A different height setting can be achieved for example by placing spacers onto the annular collar 58 of the feed pipe 12 or by radial stepping of the annular collar 58.

Following adjustment and fixing of its vertical position, the feed pipe 12 can be displaced and/or swung in an elongated hole 62 provided in the cover plate 52 into the functional position.

The disconnection bellows 14 consists substantially of a discharge part 64 fixed on the angle plate 54 and an extension arm 66 attached thereto, which extends in the direction of the dosing disc 16 and partly overlaps this. The extension arm 66 has a suction gap 68, which is shown in FIG. 4 and faces the dosing disc, and a suction slot 70 running in the circumferential direction of the dosing disc 16.

A vacuum is supplied at a coupling bellows 72 with the aid of the compressed air injector, which is not shown in greater detail. This vacuum causes air to flow through the sintered disc 28, through the suction gap 68 and through the suction slot 70 into the extension arm 66 and from there into the discharge part 64. In this process, powder, which was brought by the feed pipe 12 into and onto the annular dosing area 18 of the dosing disc 16, and brought by rotation of the dosing disc 16 into the area of the suction gap 68 and the suction slot 70, is evacuated to the coupling bellows 72.

The rear edge, seen in the direction of rotation, of the ring-section-shaped discharge opening of the feed pipe 12, which edge is substantially radial, serves in this case as a doctor blade 20, with which the layer thickness of the powder applied to the dosing area 18 is determined, in order thereby to achieve the desired volumetric dosing of the powder.

The feed pipe 12 is, as described above and shown in greater detail in FIG. 6, arranged above the upper side of the sintered disc 28 in such a way that only a small gap remains free between the underside of the feed pipe 12 and the upper side of the sintered disc 28.

Figure 6:
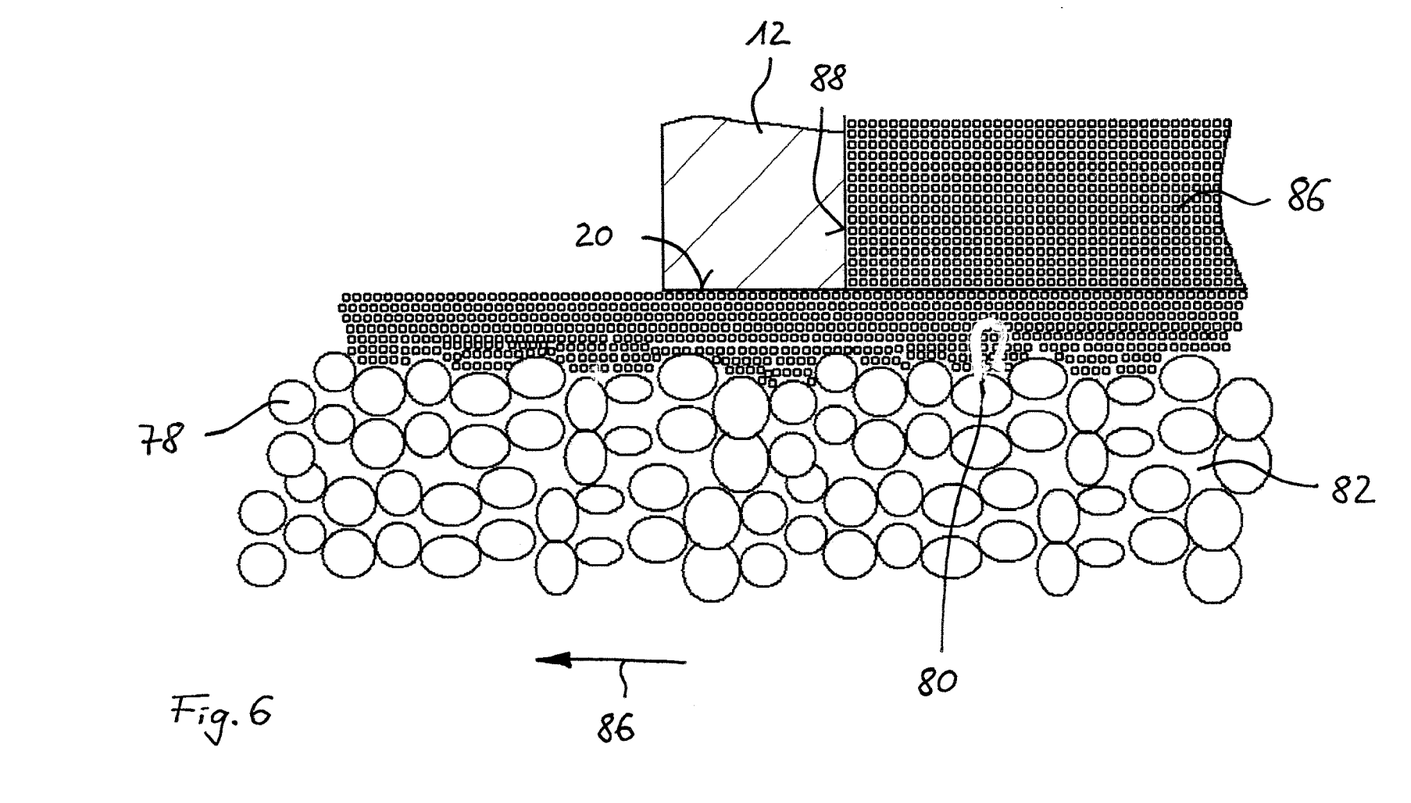
FIG. 6 shows a schematic representation of a sectional enlargement of the end side of a feed pipe facing the dosing disc.

The powder brought onto the sintered disc 28 can be conveyed through this gap on the rotational movement of the dosing disc 16 in the direction of the coupling bellows 72. The quantity of powder conveyed is thus determined by the number and volume of dosing cavities present in the sintered disc 28 and by the gap width of the gap between sintered disc 28 and feed pipe 12 as well as by the rotational speed of the dosing disc 16.

The extension arm 66, shown in greater detail in FIGS. 3 and 4, is flattened laterally in the end area, which spans the dosing disc 16 in a radial direction, in a transverse sectional view. The flattenings run towards one another slightly tapered in the direction of the dosing disc 16.

A transverse slot 70 in the extension arm 66, which slot is coordinated to a circumferential edge wall 31 of the disc carrier 30, facilitates a gap seal to the edge of the dosing disc 16 and also ensures evacuation of any powder escaping at the edge side.

The sintered disc 28 is manufactured from ceramic or metal material particles in a sintering process, thus under pressure and heating. The grain size of the material particles lies in a range from 10 to 40 μm. In the sintering process, abutting surface areas of adjacent material particles are material-bonded to one another, but many interstices still remain between the material particles, which interstices are connected to one another and form channels of different channel cross-sections.

Due to these channels, the sintered material is open-pored and air can flow through it, whether the material is acted upon by a vacuum or by excess pressure.

On the surfaces of the sintered disc 28, the ends of the small channels form a plurality of dosing cavities, which are likewise limited by the material particles that are joined only in areas. These dosing cavities are sufficiently small that powder applied does not fall through the sintered disc 28.

At least the upper side of the sintered disc 28 is repressed following sintering using a flat stamp, so that it has an exactly level form.

To support a flow of ambient air through the sintered disc 28 in a vertical direction upwards in the direction of the extension arm 66, the base of the disc carrier 30 is spaced from the underside of the sintered disc 28, so that a distribution chamber is obtained on the rear of the sintered disc 28, and an annular-shaped area of the disc carrier 30 is provided with a plurality of circular windows 76. This facilitates at least virtually complete evacuation of the powder applied to the dosing area 18 of the sintered disc 28.

In the embodiment of the invention shown in FIG. 5, in contrast to the embodiment according to FIGS. 3 and 4, a perforated disc 74 is provided instead of the sintered disc, which perforated disc is provided with a plurality of holes 75 of differing diameter arranged in concentric circles offset in relation to one another. The holes of the perforated disc are executed as blind holes and have an increasing hole diameter as the distance from the disc axis increases.

In FIG. 5, the transition of the cross-section of the feed pipe 12 from the circular shape in the case of the storage hopper to the ring segment shape in the case of the dosing disc 16, with end edges lying in the direction of rotation of the dosing disc, which edges are oriented substantially radially, and connecting edges in the form of an arc of a circle, can be recognized easily.

Furthermore, the edges of the feed pipe 12 acting as a doctor blade 20 on rotation of the dosing disc 16 and oriented substantially parallel to radial lines of the dosing disc 16 can be recognized. In contrast to the sintered disc 28 according to FIGS. 3 and 4, no flow through the dosing cavities in a vertical direction upwards into the suction gap 68 takes place in the case of the blind holes of the perforated disc 74, rather the powder is sucked out of the blind holes by the evacuated ambient air.

In FIG. 6, a sectional enlargement of a front area of the feed pipe 12 facing the dosing disc 16 is shown. The sintered disc 28 is composed of material particles 78, which are not shown to scale and which have been material-bonded to one another in contact areas by the sintering process, and between which a plurality of dosing cavities 80 and channels 82 are formed.

Powder is supplied via the feed pipe 12, which is shown only in areas, from the storage hopper 36 to the dosing area 18 of the sintered disc 28 provided with the dosing cavities 80. The powder falls into the dosing cavities 80 and penetrates up to a certain depth also into the channels 82, although these are not sufficiently wide that the powder would pass completely through the sintered disc 28.

The thickness of the powder layer on the sintered disc 28 is determined by the distance between the dosing area 18 and the lower end surface of the feed pipe 12. In this case the end edge 88 of the feed pipe 12 lying downstream in the movement direction serves as a doctor blade 20, which passes over the powder and only lets the desired powder quantity pass.

The quantity of powder discharged per unit of time is thus determined from the volume of the dosing cavities 80 filled with powder, the layer thickness of the powder layer applied to the sintered disc 28 and the speed of the drive motor 22.

In the embodiments described above, a disc-shaped dosing body was provided, which is rotated about the disc axis.

Instead of this, a cylindrical dosing body can also be provided, which has a sintered metal circumferential wall. Inlet and outlet are then located at points of the outside of the dosing body that are offset in a circumferential direction, wherein the powder particles can again be evacuated from the dosing body on outlet, in a manner similar to that described above for the dosing disc 16.

A dosing body can also be used which is moved linearly between inlet and outlet. The movement in the case of a rigid dosing body is back and forth, and in the case of a flexible dosing body is in just one direction in the manner of a conveyor belt. Flexible dosing bodies can comprise e.g. open-pored foamed materials.

The powder particles can also be removed from the dosing body at the outlet by compressed air, instead of being evacuated there.

It is to be understood that the aspects and objects of the present invention described above may be combinable and that other advantages and aspects of the present invention will become apparent upon reading the following description of the drawings and detailed description of the invention.

What is claimed is:

1. A dosing device for powder comprising:
a housing, which has an inlet for powder and an outlet for discharging a dosed quantity of powder,
a dosing body movable from the inlet to the outlet and which has a dosing area, which contains open dosing cavities, and
the inlet and the outlet both face the dosing area, and,
wherein the dosing body is a sintered material and the dosing device provides a continuous stream of air and powder, and wherein the dosing body is continuously moved from the inlet to the outlet.

2. The dosing device of claim 1, wherein the dosing area of the dosing body cooperates with a powder scraper.

3. The dosing device of claim 1, wherein the dosing body is moved by a drive motor of controllable speed.

4. The dosing device of claim 2, wherein the inlet has a feed pipe, which is arranged above the dosing body and the lower end of which forms the scraper.

5. The dosing device of claim 1, wherein outside the dosing area the dosing body has at least one calibrating projection, which cooperates in a calibration position for setting a working distance between the scraper and the dosing area with a housing-fixed stop.

6. The dosing device of claim 1, wherein the dosing cavities comprise holes and/or indentations.

7. The dosing device of claim 1, wherein the dosing body is pressed to flatness at least in the dosing area.

8. The dosing device of claim 1, wherein a gaseous fluid can flow through the dosing body.

9. The dosing device of claim 1, wherein the dosing body is carried by a support body, which together with the rear of the dosing body facing away from inlet and outlet forms a fluid distribution space, which is connected to a fluid source.

10. The dosing device of claim 1, wherein the dosing body has a substantially powder-tight circumferential collar delimiting the dosing area.

11. The dosing device of claim 4, wherein the edge of the feed pipe serving as scraper extends substantially in a direction perpendicular to the direction of movement of the dosing body, wherein the end of the feed pipe adjacent to the dosing body has preferably a clear opening with an edge contour that is in the form of a ring segment, square, or rectangular.

12. The dosing device of claim 1, wherein the dosing body has an annular dosing area, and is rotatable about the axis of the dosing area.

13. The dosing device of claim 1, wherein the dosing body has a cylindrical dosing area and is rotatable about the axis of the dosing area.

14. The dosing device of claim 1, wherein the housing and a drive motor acting on the dosing body are elastically suspended together.

15. The dosing device of claim 1, wherein the inlet is connected to a powder storage container that is funnel-shaped at least on outlet, wherein the inclination of the funnel walls to the horizontal is greater than 45°.

16. The dosing device of claim 14, wherein the powder storage container is elastically suspended together with the housing and the drive motor.

17. The dosing device of claim 3, wherein the drive motor is a stepping motor.

18. The dosing device of claim 1, wherein the sintered material is sintered metal.

19. The dosing device of claim 8, wherein the gaseous fluid is air.

20. A dosing device for powder comprising:
a housing, which has an inlet for powder and an outlet for discharging a dosed quantity of powder,
a dosing body movable from the inlet to the outlet and which has a dosing area, which contains open dosing cavities, the inlet and the outlet both face the dosing area, and
a gas outlet opposed to the outlet and for directing gas through the dosing body, and,
wherein the dosing body is a sintered material and the dosing device provides a continuous stream of air and powder, and wherein the dosing body is continuously moved from the inlet to the outlet.

* * * * *